US006749416B2

(12) United States Patent
Arndt et al.

(10) Patent No.: US 6,749,416 B2
(45) Date of Patent: Jun. 15, 2004

(54) DIE FOR A ROTARY COMPRESSION PRESS

(75) Inventors: Ulrich Arndt, Lauenburg (DE); Andreas Arning, Talkau (DE); Heinrich Behrmann, Schwarzenbek (DE); Helmut Bommrowitz, Mölln (DE); Thomas Heinrich, Stelle (DE); Jürgen Hinzpeter, Schwarzenbek (DE); Thomas Jacob, Geesthacht (DE); Peter Lüneburg, Berkenthin (DE); Nils Petersen, Hohnstorf (DE); Hans-Joachim Pierags, Pronstorf (DE); Jürgen Schikowski, Schwarzenbek (DE); Elke Wittenberg, Gülzow (DE); Hans Wolf, Schwarzenbek (DE); Ulrich Zeuschner, Schwarzenbek (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 226 days.

(21) Appl. No.: 09/764,179

(22) Filed: Jan. 17, 2001

(65) Prior Publication Data

US 2001/0041198 A1 Nov. 15, 2001

(30) Foreign Application Priority Data

May 11, 2000 (DE) ........................................ 100 24 340

(51) Int. Cl.[7] ................................................ B29C 43/32

(52) U.S. Cl. ........................ 425/193; 425/344; 425/352

(58) Field of Search ................................ 425/193, 344, 425/345, 352, 353, 354, 355, 418, 441, 443

(56) References Cited

U.S. PATENT DOCUMENTS

| | | | | |
|---|---|---|---|---|
| 3,593,366 A | * | 7/1971 | Smith | 425/78 |
| 4,487,566 A | * | 12/1984 | Barna | 425/193 |
| 5,148,740 A | * | 9/1992 | Arndt et al. | 100/264 |
| 5,314,323 A | * | 5/1994 | Bolles | 425/186 |
| 5,843,484 A | * | 12/1998 | Derflinger et al. | 425/78 |
| 5,843,488 A | * | 12/1998 | Korsch et al. | 425/193 |
| 5,902,512 A | * | 5/1999 | Streit | 249/103 |
| 6,050,798 A | * | 4/2000 | Konig | 425/3 |
| 6,308,929 B1 | * | 10/2001 | Wieder | 249/103 |
| 6,361,305 B1 | * | 3/2002 | Hinzpeter et al. | 425/193 |
| 6,361,306 B1 | * | 3/2002 | Hinzpeter et al. | 425/193 |

FOREIGN PATENT DOCUMENTS

| | | |
|---|---|---|
| DE | G 88 16 064 | 4/1989 |
| DE | G 94 09 108.0 | 9/1994 |
| EP | 0 448 190 | 11/1994 |

* cited by examiner

*Primary Examiner*—Joseph Drodge
*Assistant Examiner*—Emmanuel Luk
(74) *Attorney, Agent, or Firm*—Vidas, Arrett & Steinkraus

(57) ABSTRACT

A die for a rotary compression press, comprising a die holder axially supported in a guide bore and a die insert which is seated in the end-side bore of the die holder via a trunnion-shaped projection and is adapted to be mounted via releasable fastening means, wherein the projection is helically guided in the bore between axially spaced stops and is biased by a spring towards the associated front-end face of the die holder.

10 Claims, 1 Drawing Sheet

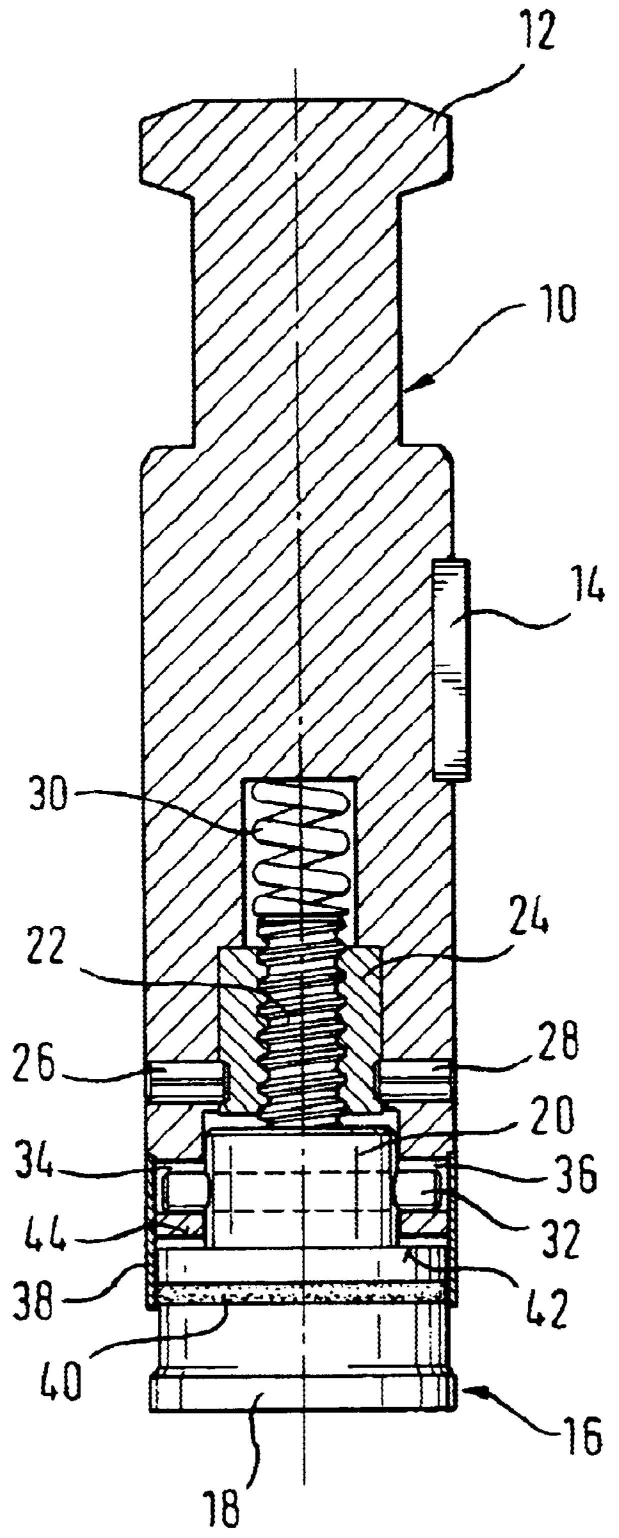
12
10
14
30
24
22
26
28
20
34
36
32
44
38
42
40
16
18

DIE FOR A ROTARY COMPRESSION PRESS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a die for a rotary compression press. As is known, rotary compression presses have top and bottom rams which are axially guided in respective die guides of the rotor and which interact with die-plate bores of the die-plate. Actuation of the rams is effected by means of stationary control cams. The compressing process, which is performed by means of the rams, is caused by pressure rollers against which the rams run and which press the rams downwards or upwards for the purpose of compressing the powdered material filled into the die-plate bores.

It is known to shape the rams from two portions, namely a shank-like holder which interacts with the pressure rollers and an insert which is adapted to be releasably connected to the ram holder. The ram insert constitutes the compressing process tool proper and, thus, determines the contour of the compact.

From the utility model DE 88 16 064, a rotary compression press has become known in which the shank of the compressing rams has a toothing which interacts with a toothed rack which is stationary. The rotary motion of the top and bottom rams immediately following the compressing process and during the extraction of the rams from the die-plate bore is intended to achieve a separation from the surface of the compacted tablet.

From EP 0 448 190, a rotary compression press has become known in which the top and bottom rams are guided in bushings which, in turn, are rotatably supported and toothed in order to cooperate with a stationary toothing. The ram shanks are linearly guided in the bushings. For a reduction in wear on the pressure rollers and those heads out of the heads which face the rollers it has also become known to design the rams in two portions and to configure them so as to be rotatable against each other. The gear-operated drive now takes place only on the lower ram portion which as was stated can be rotated with respect to the upper one.

It is the object of the invention to provide a die for rotary compression presses in which a separate drive may be dispensed with for a relative rotation with respect to the compacted tablet.

BRIEF SUMMARY OF THE INVENTION

According to the invention, the projection of the die insert is helically guided in the bore between axially spaced stops and is biased by a spring towards the front-end face of the die holder. At the start of a compressing process, the die insert moves into the die holder up to a firm stop. During this axial motion, a limited rotary motion of the die insert takes place at the same time. After the compressing operation, the die is raised and the spring restores the die insert back to the initial position. At this time, the die insert performs a rotation, which causes it to separate from the tablet.

Various constructional solutions can be imagined in realizing a die of the type described. According to an aspect of the invention, one consists in that a threaded spindle is connected, in a non-rotary relationship, to the free end of the projection and the bore has disposed therein, in a non-rotary relationship, a spindle nut with which the threaded spindle interacts. According to another aspect of the invention, the spindle nut may be located by means of radial pins in the die holder. According to a further aspect of the invention, the projection of the die insert has at least one radial trunnion which engages a groove of the die holder wherein said groove is sized so as to allow for an axial motion of the die insert. According to a further aspect of the invention, the trunnion can be the end of a radial pin by which the spindle is located in a bore of the projection. For an efficient transmission of the compressing force from the die holder onto the die insert, an aspect of the invention provides that the axial motion of the die insert is limited by its abutting action against the front-end face of the die holder.

For an efficient separation of the die face from the surface of the compacted tablet, it is sufficient to effect a relative rotational motion through a limited angle of rotation. For example, the angle of rotation is 10 to 30°, preferably about 20°.

The invention will now be explained in greater detail with reference to an embodiment shown in a drawing.

BRIEF DESCRIPTION OF THE SEVERAL VIEWS OF THE DRAWINGS

While this invention may be embodied in many different forms, there are described in detail herein a specific preferred embodiment of the invention. This description is an exemplification of the principles of the invention and is not intended to limit the invention to the particular embodiment illustrated.

The single FIGURE shows a section through a die according to the invention.

DETAILED DESCRIPTION OF THE INVENTION

Referring to the drawing, the die has a die shank or die holder 10 including a head 12 which, in a known manner, interacts with pressure rollers of the rotary compression press (not shown). The die holder 10 is guided in bores of the die guide (not shown) and is prevented from rotating by a key 14. A die insert 16 can be seen at the lower end of the die holder 10. It comprises an approximately cylindrical tool portion 18, a trunnion-shaped cylindrical projection 20, and a threaded spindle 22. A stepped bore is formed on the die holder end opposed to the head 12. The first bore portion which is of the largest diameter has slidingly guided therein the projection 20. Another bore portion which is of a somewhat smaller diameter has disposed therein a spindle nut 24 which is axially located and secured against rotation in the bore portion by means of two radial pins 26, 28 which are opposed to each other. The threaded spindle 22 interacts with the nut 24. A last bore portion which is of an even smaller diameter has disposed therein a helical compression spring 30 which bears against the bottom of the bore and acts upon the spindle 22, biasing it away from the head 12.

Radially extended through the projection 20 is a cylindrical pin 32, which protrudes like a trunnion on the two sides of the projection 20. The protruding portions are disposed in radial slots 34 and 36 of the die holder 10 with the width of the slots 34, 36 distinctly being larger than the diameter of the pin 32.

The lower end of the die holder 10 has mounted thereon a sleeve 38 which covers the slots 34, 36 and extends, in part, across the tool portion 16. The latter has received, in a ring groove, an O-ring 40 which sealingly interacts with the inside of the sleeve 36. This prevents the entry of impurities.

The drawing shows the state of the die that it takes if no compressing process is performed. During the compressing process, the tool portion 18 gets into contact with the material being compressed. This generates a relative axial force between the insert 16 and the die holder 10. The insert is urged towards the die holder 10 and is rotated at the same time because of the interaction of the nut 24 and the spindle 22 until the upper shoulder 42 of the tool portion comes to bear against that front-end face 44 of the die holder 10 which faces it. This has to be the case not later than at the point where significant compressive forces are built up to compact the tablet. When the die holder 10 is raised subsequently the die insert 16 may be pushed downwards again via the previously tensioned spring 30. During this motion, a certain rotation of the die insert 16 will also take place and, hence, a relative rotation between the tablet and the die face turned thereto. This will cause a separation between these components even if a certain adhesion has occurred before.

The dimensions described are such that the pin 32 does not strike against the upper side of the slots 34, 36; the faces 42 and 44 will come to bear against each other before. Therefore, the pin 32 merely needs to absorb the force of the spring 30 or the impact which is produced when the pin comes to bear against the underside of the slots 34, 36.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A punch for a rotary compression press which has a rotor, the rotor having a least one die bore and at least one guiding bore for the axial guidance of the punch, the punch having a shank received by the guiding bore, key locking mechanism between the guiding bore and the shank preventing rotation of the punch in the guiding bore, the punch further having an insert adapted to engage the die bore for the compression of material in the die bore, the die insert being seated in an end-side bore in a front-end face of the shank and having a trunnion-shaped projection which is seated in the end-side bore and mounted via releasable fastening member, the die insert being biased by a spring toward the front-end face, the insert being adapted to antomatically rotate in the end-side bore in a first rotational direction and to be axially moved against the bias of the spring against an upper stop by means of a cooperation of threaded spindle and spindle nut, when the insert is pressed into the die bore against the material therein and to rotate back in the reverse rotational direction and to be axially moved against a lower stop axially spaced from the upper stop when the insert is moved out of the die bore.

2. The punch according to claim 1, characterized in that the threaded spindle is connected, in a non-rotary relationship, to a free end of the projection and the bore has disposed therein, in a non-rotary relationship, the spindle nut with which the threaded spindle interacts.

3. The punch according to claim 2, characterized in that the spindle nut is located via at least one radial pin.

4. The punch according to claim 2, characterized in that the projection has provided thereon at least one radial trunnion which engages a groove of the die holder wherein said groove is sized so as to allow for an axial motion of the die insert.

5. The punch according to claim 4, characterized in that said trunnion is the end of a radial pin by which the spindle is located in a bore of the projection.

6. The punch according to claim 1, characterized in that the axial motion of the die insert is limited by its abutting action against the front-end face of the die holder.

7. The punch according to claim 1, characterized in that the angle of rotation of the die insert is about 10 to 30°.

8. The punch according to claim 1, characterized in that a helical spring is disposed in said bore.

9. The punch according to claim 3, characterized in that the projection has provided thereon at least one radial trunnion which engages a groove of the die holder wherein said groove is sized so as to allow for an axial motion of the die insert.

10. The punch according to claim 7 wherein the angle of rotation is about 20°.

* * * * *